(12) United States Patent  
Bourgault

(10) Patent No.: US 7,334,740 B2
(45) Date of Patent: Feb. 26, 2008

(54) METHOD AND APPARATUS FOR MELTING SNOW AND ICE

(75) Inventor: Pierre Bourgault, Ottawa (CA)

(73) Assignee: Chinook Mobile Heating and Deicing Corporation, Ottawa, Ontario (CA)

(*) Notice: Subject to any disclaimer, the term of this patent is extended or adjusted under 35 U.S.C. 154(b) by 117 days.

(21) Appl. No.: 10/868,690

(22) Filed: Jun. 15, 2004

(65) Prior Publication Data

US 2005/0029403 A1 Feb. 10, 2005

(51) Int. Cl.
*E03B 7/10* (2006.01)

(52) U.S. Cl. .......................................... 237/80; 237/68

(58) Field of Classification Search ................. 237/80, 237/68
See application file for complete search history.

(56) References Cited

U.S. PATENT DOCUMENTS

2006/0107910 A1* 5/2006 Bourgault .................... 122/36

* cited by examiner

*Primary Examiner*—Timothy D. Collins
(74) *Attorney, Agent, or Firm*—Thaddius J. Carvis

(57) ABSTRACT

Disclosed in this invention is a method and device for de-icing, snow melting and thawing frozen ground. The invention is based on warm moisture-laden air that can be blown over the surface to be iced or thawed or it can be introduced into an enclosed area where de-icing, ground thawing or snow melting is desired. The device consists of three components: a hot water or a steam boiler with an associated pump; a plenum for heating and humidifying air; and a delivery unit or head that brings the moisture-laden air into contact with the surface to be de-iced or thawed. In one embodiment the boiler is replaced by a direct fired burner. The delivery unit may be an air blanket with multiple perforations attached to an air duct or an inverted saucer-like delivery head likewise attached to an air duct, coming from the plenum or it can be simply an enclosed space in which is located the object to be de-iced or thawed and into which the hot moisture-laden air is conducted.

4 Claims, 8 Drawing Sheets

METHOD AND APPARATUS FOR MELTING SNOW AND ICE

FIELD OF THE INVENTION

This application relates to de-icing, ground thawing and snow melting devices and methods to carry out these practices. In particular, the present invention relates to such things as de-icing ice-covered surfaces such as aircraft, helicopter blades, walkways and driveways. It also relates to ground thawing such as that necessary in the construction industry prior to pouring concrete slabs or doing winter work on underground pipes and sewers. Finally, the device relates to such things as snow melting as in winter construction sites or generally clearing snow wherever it is not possible to do so with plows and blowers such as roofs or thawing frozen water pipes or sewer maintenance.

BACKGROUND OF THE INVENTION

One of the most common areas where de-icing of frozen surfaces required in northern climates is that of de-icing aircraft and helicopter blades. The most common method of de-icing these vehicles is by spraying wings, fuselage and blades with a hot glycol water solution. The main function of the glycol spray is to melt the ice and the snow already there and to warm the surface in order to provide a brief period of protection against further icing. Many other hot liquid solutions, organic and inorganic, have been described in patents and have been shown to work but they all have major drawbacks and glycol remains the material of choice. De-icing a large aircraft can cost upwards of $10,000, and it is estimated that Glycol sales to the airline industry exceed $200 million per year. Infrared heating systems are also available for aircraft de-icing and have found some limited applications. Helicopter blades present a special problem as it is considered desirable to avoid getting organic or inorganic material, even glycol in the blade mechanisms. Various systems are described to de-ice helicopter blades using warm air. These usually involve the use of a sock or other form of cover over the blades through which warm air is circulated.

In Canada and other northern regions, there is a need to thaw the ground in construction, municipal works and other activities as concrete cannot properly be laid over frozen ground. Now that construction is a year round activity, builders are increasingly making use of ground thawing techniques. Two approaches to ground thawing are commonly used. In the first, the space over the area to be thawed is covered and warm air is introduced into the space. In a second method, an array of flexible hose is laid over the area to be thawed and covered with an insulating blanket. Hot water or glycol is then circulated through the hose. Both methods are slow. Dry, warm air does not contain a lot of heat unless introduced at very high temperatures; something that is not practiced in most applications. In the second method, higher temperatures can be used but only a small fraction of the ground surface comes in contact with the hot hoses. Heat transfer is limited by the rate of transfer to the ground. Both methods being relatively ineffective, the ground thawing process can hold up large construction projects for numbers of days or weeks at a very high cost. Thus, there appears to be a need for a less costly method of de-icing of aircraft and helicopter blades and a faster, more effective method for thawing ground around construction sites.

SUMMARY OF THE INVENTION

Therefore, this invention seeks to provide a method of de-icing, melting and thawing surfaces, snow and ice and frozen ground, comprising: heating an aqueous liquid in a boiler to a high temperature below the boiling point; directing said heated liquid into a series of nozzles in a closed plenum; blowing ambient air into said plenum and through heated spray liquid emitted from said nozzles; directing heated and moisture-laden air into an outlet duct; and directing said heated and moisture-laden air from said duct to a delivery device that brings said moisture-laden air in direct contact with said surfaces, snow and ice and frozen ground, thereby melting and thawing same.

This invention also seeks to provide an apparatus for de-icing, melting and thawing surfaces, snow, ice and frozen ground comprising: a boiler with an aqueous liquid adapted to be heated; an outlet hose adapted to carry liquid from said boiler; an inlet hose adapted to return liquid to said boiler; a series of pipes and nozzles connected to said outlet hose; a circulating pump adapted to move said liquid from said boiler through said outlet hose and said pipes and nozzles; a plenum-type housing adapted to contain said nozzles; a blower adapted to introduce ambient air into said plenum-type housing; said air in operation being forced through said heated liquid from said nozzles; an outlet connected to said plenum-type housing and an outlet duct connected to said outlet; said outlet duct being adapted to direct warmed, moisture-laden air to a delivery head structure; said delivery head structure being proximate to either said surface, snow and ice, or said frozen ground, thus permitting said warm, moisture-laden air to pass there through such that melting or thawing occurs.

The invention also seeks to provide a method of de-icing, melting and thawing surfaces and frozen ground comprising: heating a liquid in a boiler until it becomes vaporized into steam; directing a first portion of said steam through a series of enclosed coils in a plenum-type housing; directing a second portion of said steam through a series of nozzles located in said plenum-type housing; introducing and blowing ambient air through said plenum, past said nozzles and said coil; directing moisture-laden ambient air out of said plenum-type housing to a duct and delivery head, thereby melting ice, snow or frozen ground.

The invention also seeks to provide a method of de-icing, melting and thawing surfaces and frozen ground comprising: heating an aqueous liquid in a boiler until it becomes vaporized into steam; injecting said steam into a plenum-type housing through a series of nozzles located in said plenum-type housing; simultaneously injecting a spray of finely divided water particles in very near proximity to the injected steam; blowing ambient air into said plenum, and passed said nozzles and injected spray of water particles and directing warmed moisture-laden air out of said plenum-type housing to a duct and delivery head, thereby melting ice, snow and frozen ground.

Control of the temperature of the moisture-laden air is done by the use of a valve controlled by a thermostat that measures the temperature of the outgoing air and adjusts the flow of steam accordingly. Control of the moisture content is done by measure of a wet bulb temperature measuring device or humidistat that control the amount of liquid water injected by the spray nozzles.

This invention also provides an apparatus for melting snow, ice and frozen ground comprising: a boiler adapted to heat an aqueous liquid to a temperature below the boiling point; a first circulating pump; an outlet line; an inlet line; a series of enclosed coils located in a plenum-type housing and adapted to carry said heated liquid; a separate, unheated water supply and second circulating pump adapted to carry said unheated water to nozzles and direct said water at said enclosed coils; a blower adapted to move ambient air past said nozzles and said enclosed coils to an outlet of said plenum-type housing and through a delivery duct and delivery head located proximate to a surface to be melted; and a reservoir adapted to catch surplus saturating water and direct it back to said second circulating pump.

Finally, this invention seeks to provide an apparatus for melting snow, ice and frozen ground comprising: an elongated plenum-type housing; a blower attached to one end of said plenum-type housing; said blower, in operation, adapted to force ambient air into said housing; said apparatus further comprising: an open flame heat source located in said plenum-type housing proximate to said blower; a fine water spray applicator located in said plenum-type housing downstream from said open flame heat source; wherein, in operation, incoming ambient air is heated to a high temperature by said heat source and thereafter, cooled and moistened by said fine water spray applicator, thereby producing warm moisture-laden air at a temperature less than 200° F., which exits said plenum-type housing at an opposite end from said blower to a delivery head proximate the snow and ice to be melted.

The rate of thawing that can be achieved by a stream of air is proportional to the amount of heat that is carried by that airstream. This in turn depends in part upon the temperature of the air, but more importantly, it depends upon the moisture content of the air. Air with a high degree of humidity contains more heat than dry air. This is most apparent in saturated air at higher temperatures. At one end of the spectrum is 100% water vapor, i.e. live steam, (which must be at 212° F. in order to exist at atmospheric pressure). Cooling one pound of live steam by, say 40° F., to convert it into liquid water at 172° F. releases 1000 BTUs of heat.

In order to get 1,000 BTUs of heat from one pound of dry air, one would have to cool it by 4000° F. More realistically, one would have to use 100 times more air, i.e. we would cool 100 lbs of air by 40° F. Lower concentrations of water vapor in air carry lower amounts of energy, but the amounts are still impressive. Air that is saturated at 175° F. may be thought of as half steam and half air. It has half the energy of live steam without being nearly as dangerous to handle. Near the other end of the spectrum, e.g. at 70° F., air that contains no moisture, has an enthalpy, (i.e. energy content), of 17 BTUs per pound. Air at the same temperature, which is at 100% relative humidity has an enthalpy twice as high, i.e. 34 BTUs per pound. For saturated air, the energy content increases dramatically as temperature is increased. At 150° F., air that contains no moisture has an enthalpy of 36 BTUs per pound, whereas if it is humidified to 100% relative humidity, it will have an enthalpy of 275 BTUs per pound. Thus, at this temperature, by adding moisture, the energy content of the air can be increased more than seven fold. At 180° F. the increase is more like 15 fold. Another way to look at it is that water saturated air at 150° F. contains more heat energy than dry air at 1000° F. Saturated air at 180° F. has more heat energy than dry air at 1500° F. Even these comparisons may understate the capacity of moisture-laden air to melt ice or snow.

Since most applications that require rapid de-icing do not allow the use of temperatures in the 1000 degree range, de-icing using warm dry air is often unacceptably slow. Such is the case for de-icing aircraft. At the present time, the most widely used method of de-icing aircraft is by spraying with hot water/glycol solution. Liquid temperatures in the range of 150 to 180° F. are typically used. The length of time required to do the job is of the order of 15 minutes. De-icing using normal warm air at a comparable temperature can take 10 times as long; a length of time that is not acceptable for a loaded aircraft.

Moisture-laden air presents a more plausible option. At 150° F., a stream of saturated air will melt ice seven times more quickly than air that was heated to the same temperature without the addition of moisture. Saturated air at 180° F. has a heat content that is more than 10 times greater than dry air at the same temperature, and its relative capacity to melt ice is in that range. With a suitable air delivery system, the present invention can attain de-icing rates up to ten times greater than warm air alone. This puts it in the same class as glycol, time wise, but at a fraction of the cost and environmental impact. A glycol-based aircraft de-icing system has added benefit over an air-based system in that it leaves a residual coating of glycol that can offer some additional short-term residual protection. In one embodiment of the present invention, as conceived for aircraft de-icing, 40% to 60% propylene glycol is used within the system itself so that after the ice and snow has been melted away, this solution can be used as a finishing spray to provide the same continuing short-term protection.

The production of moisture-laden air and its delivery to the surface to be thawed can be achieved in a number of ways. The most practical vehicles for producing moisture-laden air are described herein. They are: (a) hot water spray, (b) hot water wet-coil, (c) cold water sprayed high temperature blown air, or (d) steam. Devices to effectively deliver the moisture-laden air will be described as follows:

(a) Hot Water Spray System:

Any of a variety of commercially available water heaters may be used, provided they have adequate capacity. The heater may deliver the hot aqueous liquid directly to the plenum or it may deliver it indirectly through a heat exchanger. It may be fuel fire, (natural gas, propane, oil or even wood), or electrical. However, because of the large amounts of energy required, natural gas, propane or oil are the preferred energy sources. An optional hot water coil may be used to provide supplemental heat to the leaving moisture-laden air. This will serve to convert into water vapor, any residual water droplets that may be in the airstream. In some applications, it may be considered desirable to lower the relative humidity of the moisture-laden airstream, by raising the temperature, in order to avoid condensation in the duct leading to the delivery head. Hot water or water/glycol mix may be used, instead of water, as the source of moisture and the heat transfer medium. When water/glycol mix is used as spray, the moisture content will be lower than when water alone is used. Consequently, the energy content of the airstream will be lower by few percent if water/glycol is used. The moist air will also contain some glycol vapor. The ratio of water vapor to glycol vapor in the airstream will be determined by the relative vapor pressures of the two liquids at the given temperature. As a rough guide, glycol will constitute about 2% of the vapor if the liquid is 50% glycol. The pumping system should be capable of circulating approximately 8 GPM per 100,000 BTU of boiler heating capacity. The circulation pump must also have the capability of achieving this while overcoming the resistance offered by the spray nozzles in the humidification chamber.

(b) The Hot Water Wet-Coil Method:

A blower introduces air into a plenum using a duct in which are situated a series of coils. The actual number of coils (or rows within a coil), will be determined by the application as well as other elements of the design, but in general it will be significantly more than would be used to simply heat the air without the addition of water vapor. A circulating pump circulates water over the face and through the core of each of the coils, keeping their entire surface wet. A reservoir collects water that is in excess of what is required for evaporation. Thereafter, the water can be re-circulated. Water must be added from time to time to the reservoir to compensate for evaporation. The coils are heated by hot water or hot water/glycol mix supplied by a hot water heater of suitable capacity. The flow rate from the boiler, its capacity, et cetera, must be engineered to take into account the large quantities of heat needed to evaporate the water in addition to that required to heat the air.

(c) Cold Water Sprayed High Temperature Blown Air Method:

An elongated circular horizontally deposed plenum is used at one end of the plenum is an operative communicating through an operator to a blower. The blower forces ambient outside air into the plenum. Proximate the air intake is a flamed heat source which uses as a fuel propane, natural gas or fuel oil. As the ambient air is forced into the plenum by the blower, it is heated upwards to around 800° F. Thereafter the high temperature heated air passes through a series of fine cold water droplets emitted by nozzles. This not only cools the air to approximately 150° F. to 180° F. but also inserts moisture into the air close to or at the saturation point. The warm moisture-laden air then leaves the plenum and is directed through a duct to a delivery head which brings warm moisture-laden air in contact with snow, ice or frozen ground.

(d) Steam Method:

The blower and plenum arrangement are essentially similar to that shown for the wet coil method. In this arrangement, air entering the plenum, encounters live steam introduced from a steam boiler and then flows through a steam heated coil. The purpose of the coil is to remove water droplets that form as the steam heats the incoming cold air. The moisture-laden air, free of any water in liquid form, may then be conducted to the delivery head.

While the hot liquid required in method (a) and method (b) would normally be produced as required, directly by a hot water heater, there are circumstances where it is preferable to provide the hot water, or more generally the hot liquid, from a reservoir. Such a circumstance would be where use is intermittent and very large quantities of heat are required for a short period. Other circumstances may occur where the close proximity to the flames inherent to a gas, propane or oil-fired hot water heater, poses a risk of fire or explosion. In this latter circumstance, the reservoir may be mounted on a truck or trailer so that it may be brought directly to the site where deicing is required. Such might be the case for deicing aircraft or helicopters. In these configurations, i.e. using fixed or mobile reservoirs, the circulating pump and hoses described under method (a) and method (b) would be associated with the reservoir, and would circulate the liquid through the plenum arrangement and back to the reservoir; the supply and return, from and to the reservoir being constructed according to means, well known in the trade, that minimize mixing between the cooler returning liquid and the hot liquid in the reservoir.

In order to achieve the desired result of efficiently deicing a surface, it is important to get good heat transfer from the airstream to the surface in question. Different applications are best served with a heat delivery head designed to best suit that application.

For de-icing aircraft, an air delivery system consists of gantry housing a duct to carry the moisture-laden air that can be positioned and moved over the aircraft fuselage and wings. The moisture-laden air is conducted into a diffuser that in turn conducts the air over the surface to be de-iced, in near proximity to the surface or lightly touching the surface. The diffusor is made of soft material to avoid contacting the surface of the wing or fuselage with a hard surface. The objective is to ensure that most of the heat energy in the airstream is transferred to the surface. Because most of the heat energy in moisture-laden air is held at the higher temperatures, it is relatively easier to achieve efficient transfer of heat from a moisture-laden airstream to the cold surface than with air that is dry. When staffing with 170° F. air that is at or near saturation, cooling the airstream to 120° F. will capture 80% of the heat energy initially imparted to that air. It is not necessary to get a large degree of cooling of the air in order for it to give up most of its energy. This is illustrated by the following example: if one lb of air taken at 32° F. and simply heated to 132° F., it will absorb 25 BTU and have an enthalpy of 35 BTU. If it is then cooled and allowed to escape at 72° F., it brings with it 22.5 BTU. The amount of heat that was used for de-icing, at a maximum, is 12.5 BTU, i.e. (35-22.5) the efficiency can be no more than 50%. By comparison, one lb of air heated and saturated with water, to 132° F. will absorb 155 BTU and have an enthalpy of 165 BTU/lb. If this air loses heat and escapes at 72° F., it will bring with it 35 BTU. The difference, 165-35, i.e. 130 BTU that has been used to do the work, i.e. an efficiency of 84%. The differences between dry and moisture-laden air is even more pronounced at higher temperatures. For this reason, air leaks, always problematic in temporary enclosures, are far less important if moisture-laden air is the heating medium.

DETAILED DESCRIPTION OF THE INVENTION

Figure 1:
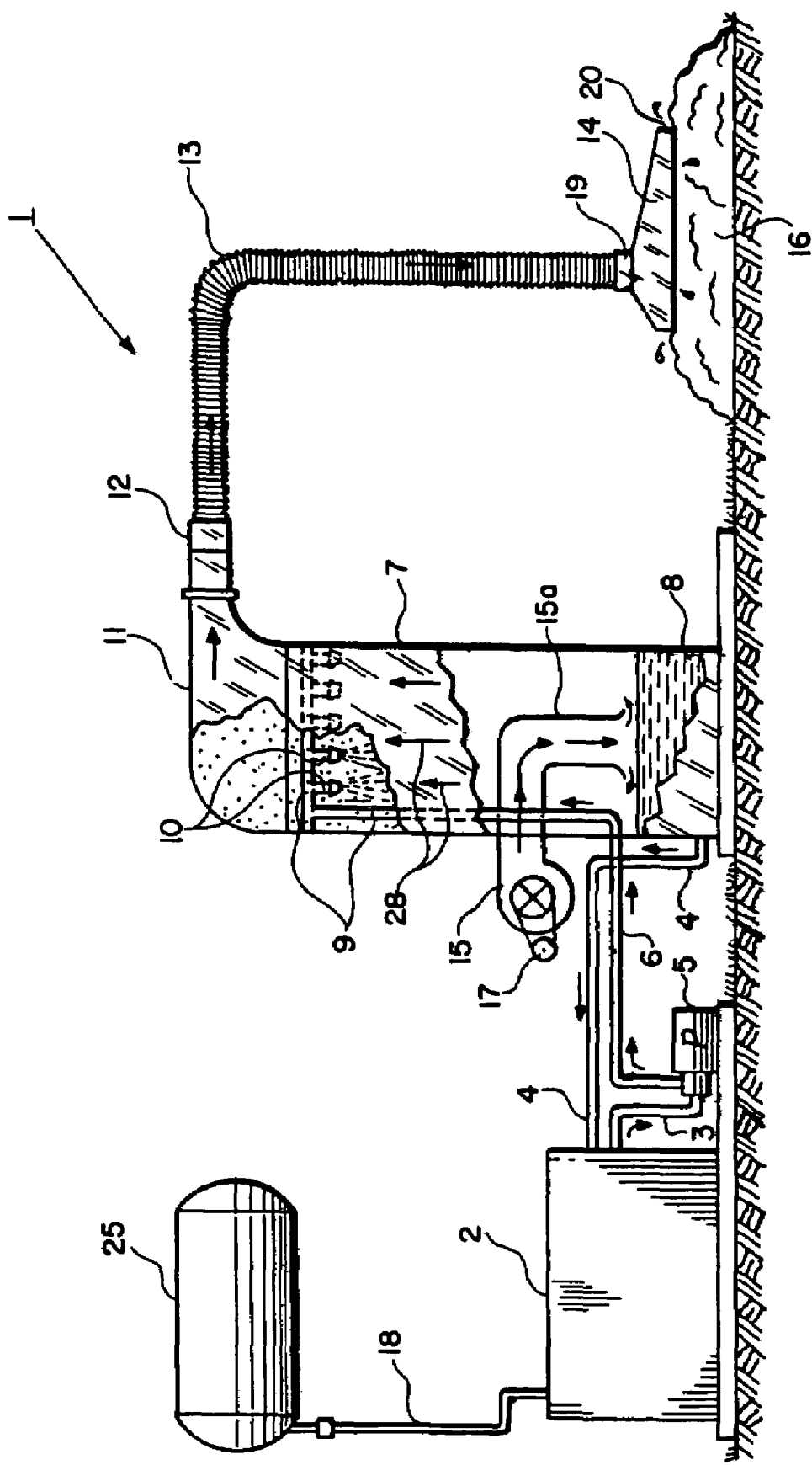
FIG. 1 is a schematic view of a first embodiment of the invention.

FIG. 1 shows a schematic view of the first embodiment of the present invention shown generally as 1. Water and glycol or simply water is heated in a boiler shown as 2. Heated liquid leaves the boiler through outlet hose 3 and returns to the boiler through return hose 4. The heated liquid, preferably around 170 to 190° F. is circulated via a pump 5. The pump 5 is generally electrical in nature and is well known in the art. The heated liquid, whether it be straight water or a water/glycol mixture, leaves the pump 5 through outlet hose 6 and is directed to the top of a container known as the plenum and marked as 7.

In a first embodiment of this invention, the plenum is approximately four to six feet square and approximately five to seven feet in height. The plenum is preferably water and air proof and contains a catch reservoir 8 at its bottom portion. Hot liquid glycol and water or water is collected in the reservoir 8 and returned through return hose 4 for reheating in boiler 2. The hot water supply hose 6 to the plenum 7 is connected to a tubular member 9, having a plurality of nozzles 10. Nozzles 10 spray heated liquid into the incoming air which is ambient air forced into the plenum by blower 15 powered by an electric motor 17.

The ambient air is forced to the bottom of the plenum 7 by a funnel-shaped structure 15a. The hot liquid from nozzles 10 warms and saturates the incoming ambient air which is forced upward past the nozzles through plenum cap 11 to the warm, moist air delivery nozzle 12. Thereafter, the warmed moist air is pushed through an insulated flexible hose 13 to a delivery head 14. The delivery head 14 directs the air over the surface to be thawed in such a manner as to provide direct intimate contact between the moisture-laden air and the surface of the snow or ice or frozen ground 16 to be thawed. The warm, moist air enters the delivery head 14 through a fixture 19, which is basically a clamped entry area for flexible duct 13. The warm air, once inside the delivery head 14 exits, directly onto the surface to be thawed thereby losing a good portion of its heat, through opening 20. Also shown in FIG. 1 and not previously mentioned, is a propane source 25 which enters boiler 2 via propane line 18. In the first embodiment the propane boiler used is of known design and capable of delivering 900 BTUs. Finally, the direction of the incoming ambient air is shown generally as 28.

Figure 2:
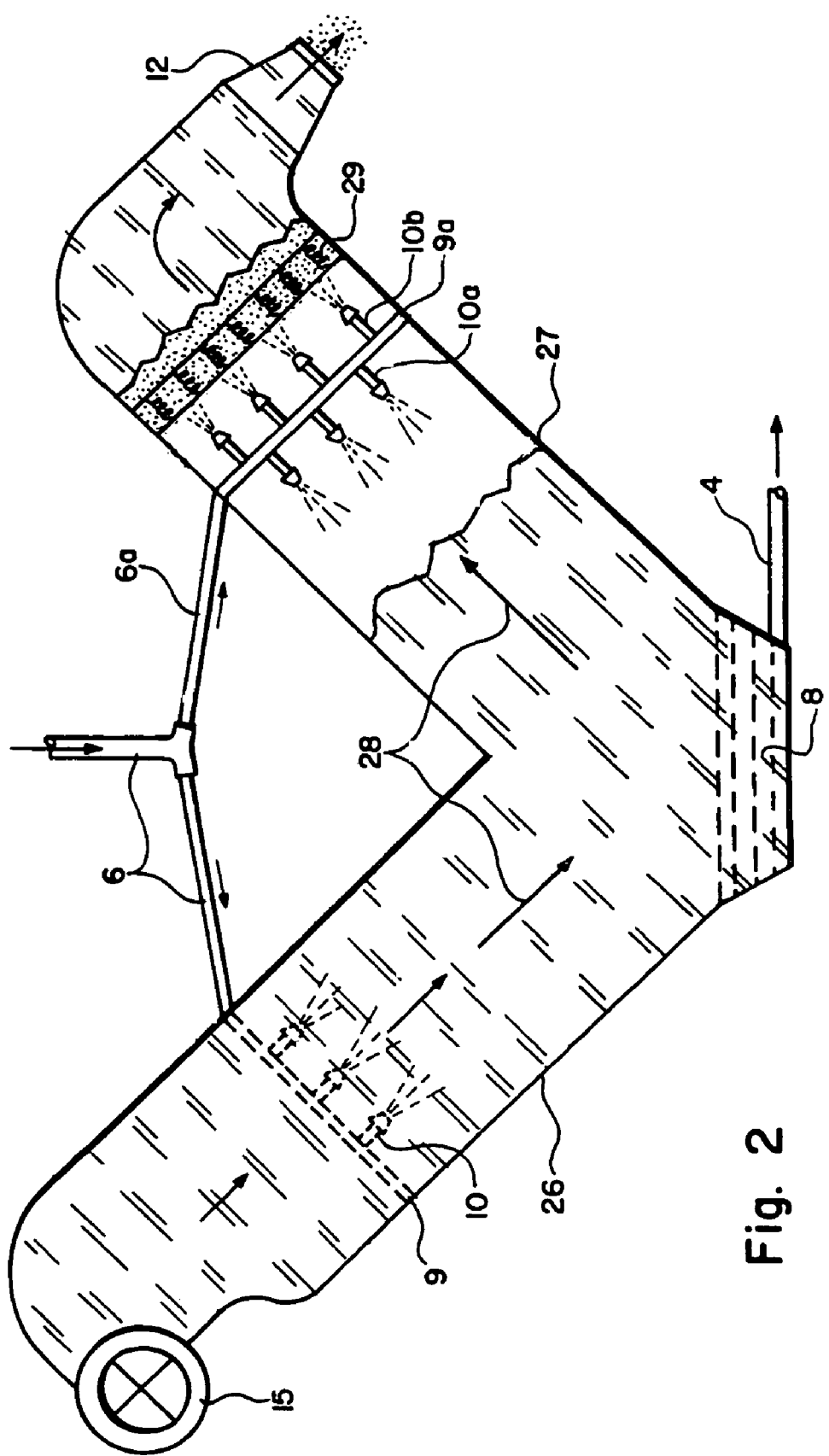
FIG. 2 is another embodiment of the same invention showing an L-shaped plenum.

In FIG. 2, a slightly modified arrangement of the invention is shown. The plenum, previously marked 7 in FIG. 1, is divided into downward and upward air flow chambers 26 and 27 respectively. The air flow is marked as 28. The hot water or glycol from the boiler which supplies hose 6, has an auxiliary hose 6a. Thus supply hose 6 runs generally to supply piping 9 and nozzles 10 and auxiliary hot water hose 6a runs to hot water glycol supply hose 9a and nozzles 10a and 10b. The embodiment in FIG. 2 also includes a heat coil 29. The heat coil 29 helps to warm the air and in the embodiment shown, it is wetted by nozzles 10b facing opposite to nozzles 10a thereby increasing the output of the system while eliminating the excess droplets entrained in the air. The excess water or water glycol liquid is collected in a reservoir 8 and returned to the boiler through return pipe 4.

Figure 3:
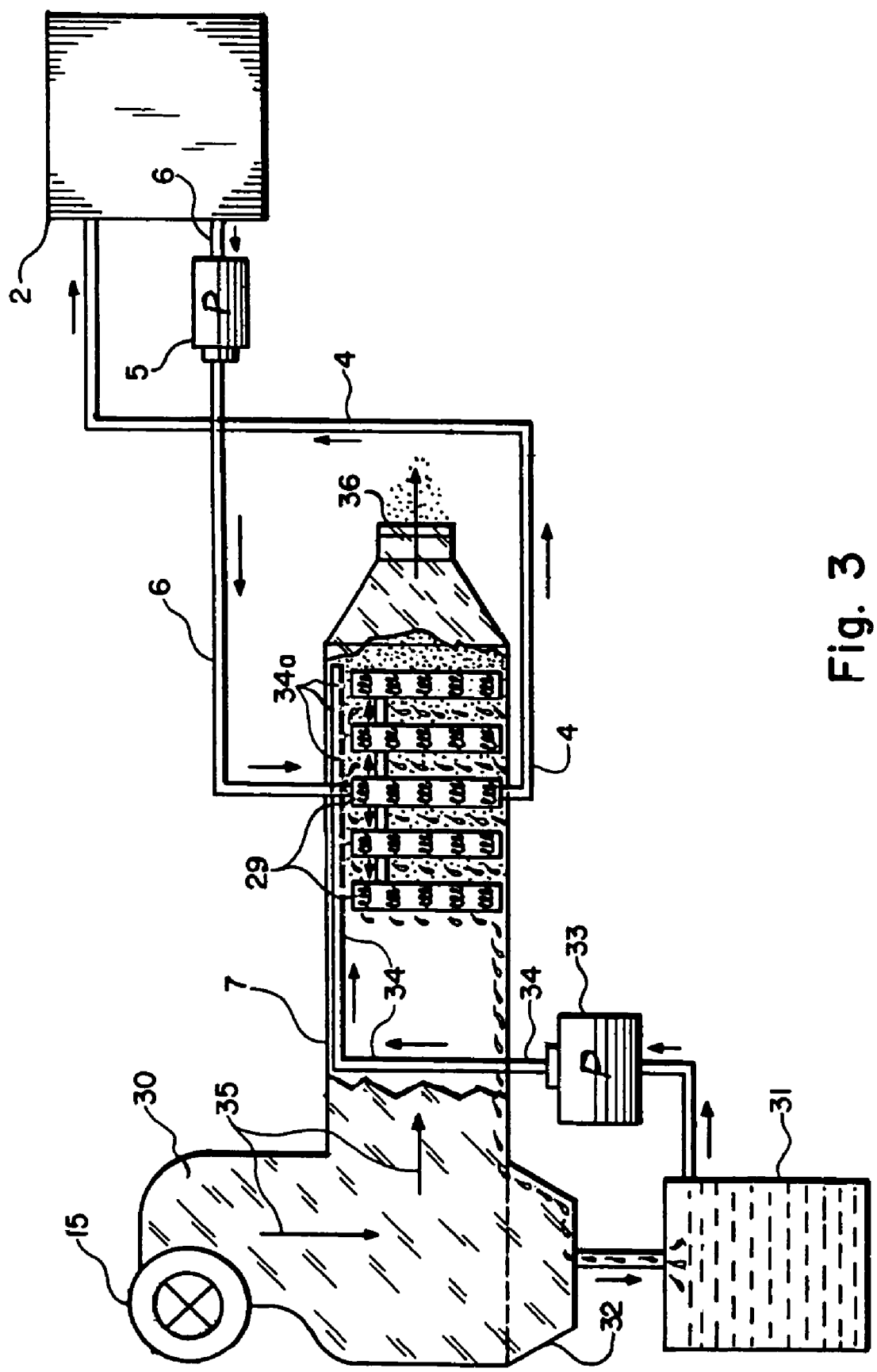
FIG. 3 is a schematic view of a second embodiment of the invention.

In FIG. 3, a different embodiment of the invention is shown. Again, heated liquid, either in the form of water or water/glycol solution, leaves boiler 2, travels through circulation pump 5 and hot liquid supply hose 6. Hot water supply hose 6, rather than going to nozzles as shown in previous figures, enters into a series of heating coils 29 and then returns as usual through a return flow valve 4. The ambient air blown by blower 15 enters through air inlet 30, and follows the path of arrows 35 and exits in a heated, moist condition through nozzle 36. Meanwhile, water which collects in catch basin 32 drips down to reservoir 31 is circulated upward by pump 33 through inlet hose 34. Inlet supply hose 34 is perforated with a number of holes 34A. Thus, ordinary water drips down around coils 29 wetting the coils such that as the air 35 passes through the series of wetted coils, 29, it becomes moisture laden and warmed and thereafter leaves at nozzle 36.

Figure 4:
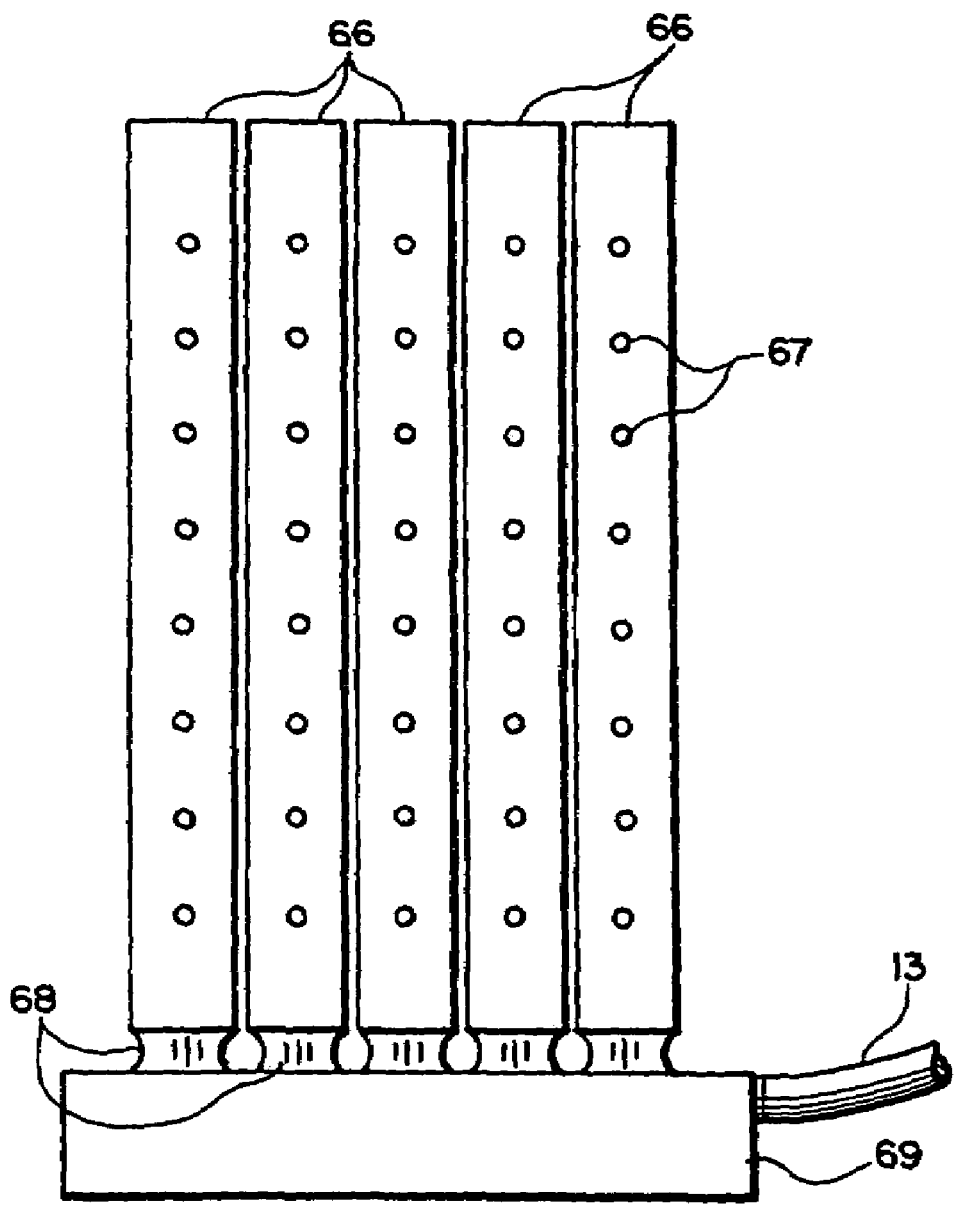
FIG. 4 is a bottom view of a first delivery device.

FIG. 4 is a bottom view of one embodiment of a delivery device which is of particular value for melting snow and ice on walkways and driveways. The device consists of a number of elongated flexible ducts or tubing 66 from 12 to 18 inches in diameter. There are a number of apertures 67 on the underside which permit the warm moist air to come in contact with the surface to be melted. Tubes 66 are attached by junction hoses 68 to manifold 69. Warm moist air is fed to the delivery device by duct 13.

Figure 4A:
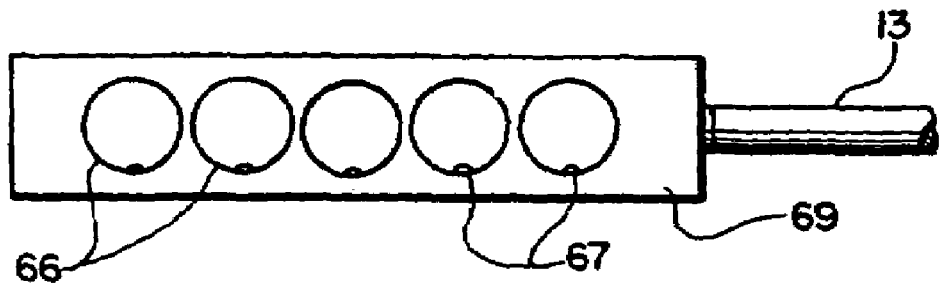
FIG. 4a is an end view of said first deliver device.

FIG. 4a is an end view of the device in FIG. 4.

Figure 4B:
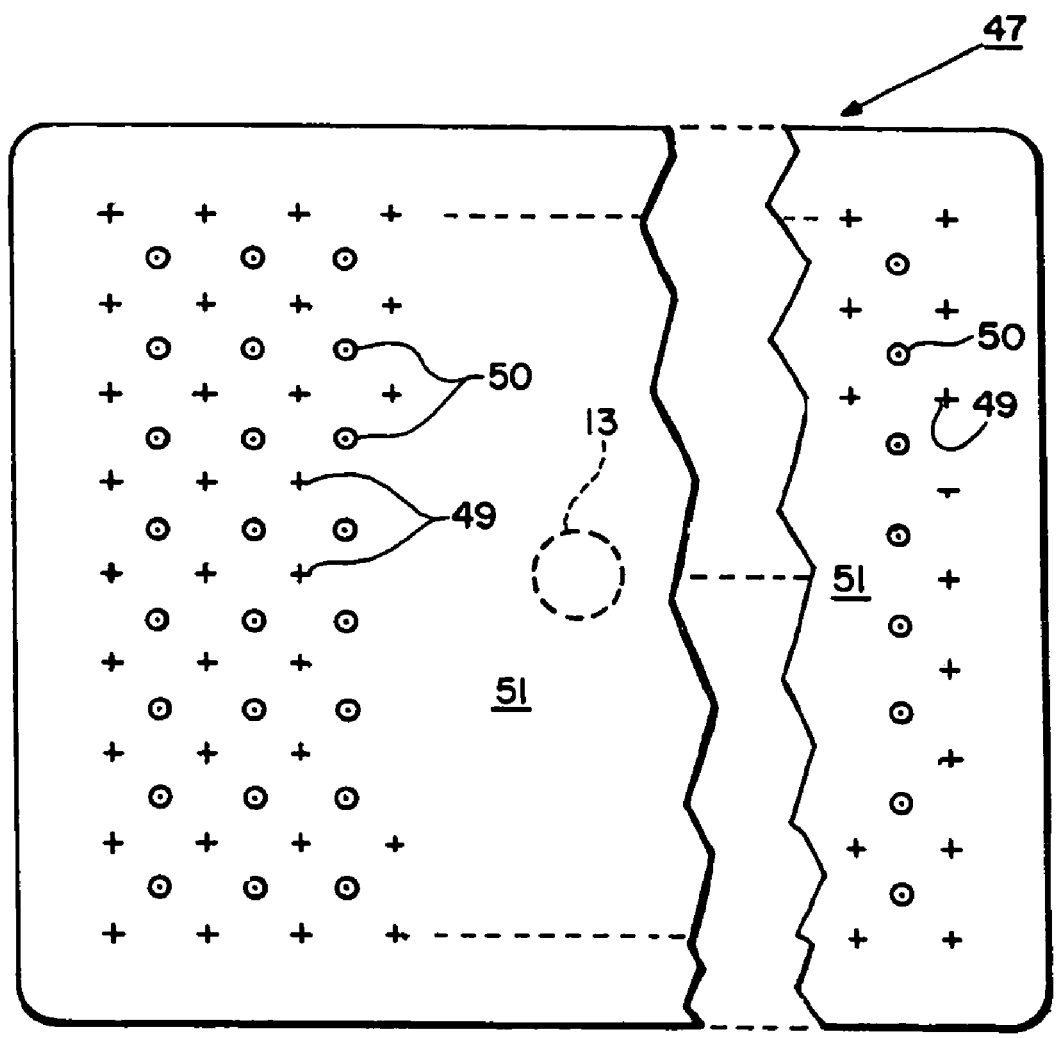
FIG. 4b is a bottom view of a second delivery device.
Figure 4C:
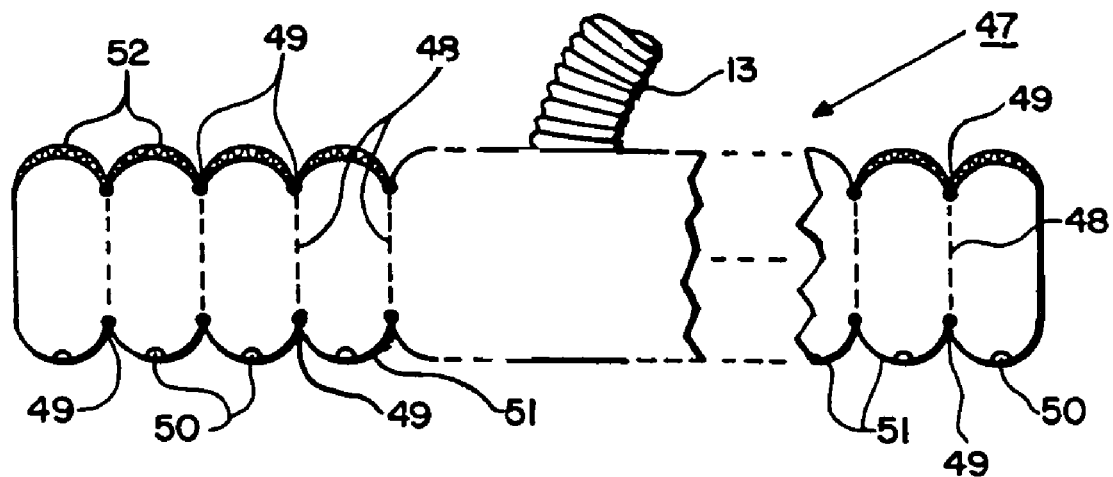
FIG. 4c is a side view of the same device.

FIG. 4b shows the bottom 51 of a flexible mattress-type fabric delivery device 47, and FIG. 4c shows a side view of the same device. Tie strings 48 are secured at the top and bottom of the device by button clips 49. This creates a mattress-type effect which increases turbulence of the warm water-laden air. This warm moist air which enters the device through duct 13 escapes downwardly through orifices 50 towards the surface to be melted. The top 52 of the delivery device is preferably insulated. The orifices are arranged to create about one half inch of static pressure inside of the device such that it retains its form and can be maneuvered as required over the surface to be melted. A lesser pressure created between the delivery device and that by escaping air will in general maintain a separation between the surface and the device.

Figure 5:
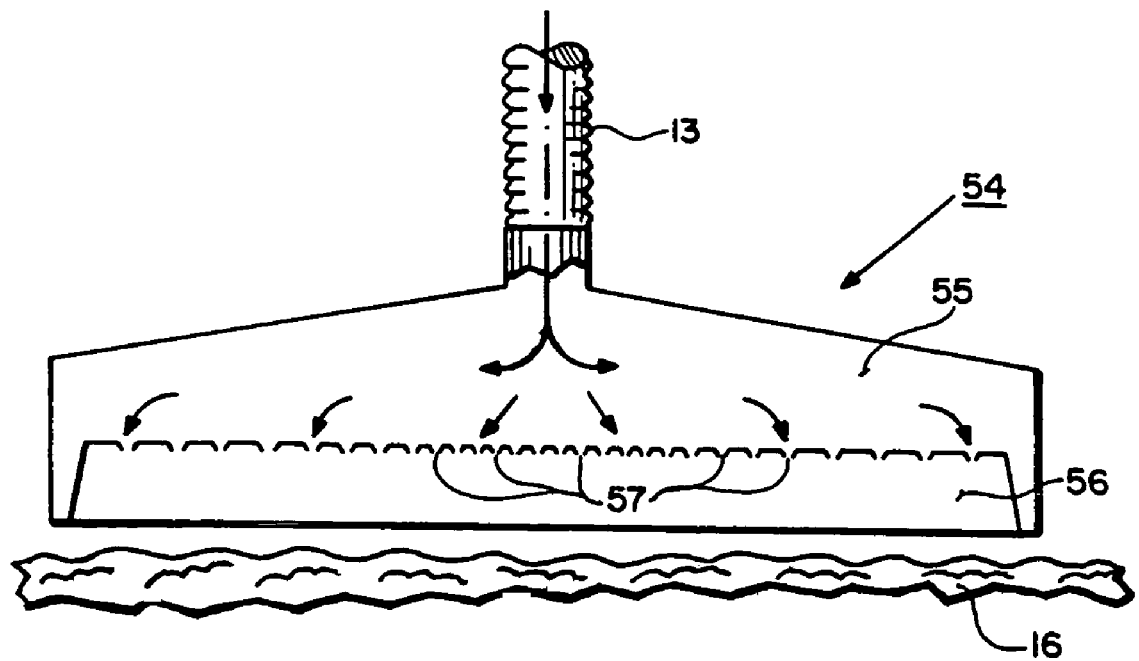
FIG. 5 is a schematic view of one device using a third embodiment of the invention.
Figure 5A:
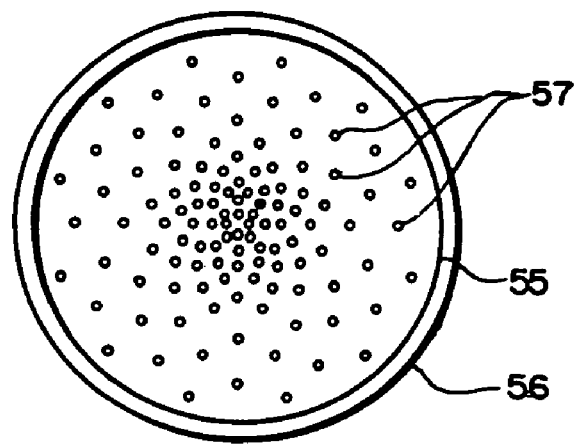

FIG. 5 shows the side view of another warm air delivery head 54 and 5a shows a bottom view of the same device. Warm moisture-laden air enters the delivery head through insulated duct 13. It first enters upper chamber 55 and then moves downwardly to chamber 56 through orifices 57. Orifices 57 are made in a size and quantity to produce a robust exit of the moisture-laden air on to the surface to be de-iced or thawed which will create about one-half inch of static pressure in the space above the orifices.

Figure 6:
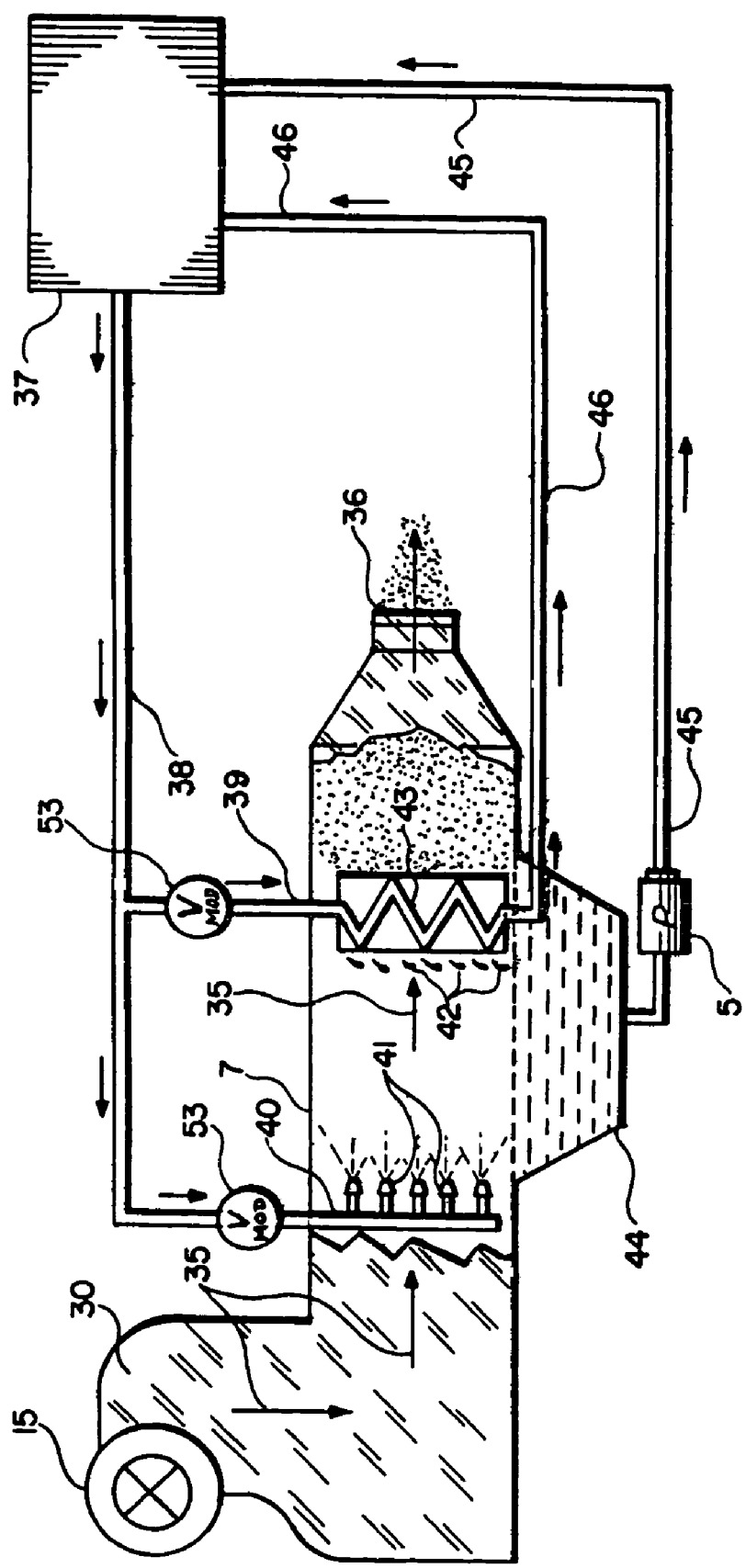
FIG. 6 is a schematic view of a second device using the third embodiment of the invention, i.e. steam.

FIG. 6 illustrates the steam embodiment of the invention. Steam boiler 37 produces steam which flows through outgoing line 38. Outgoing line 38 then separates into a first branch line 39 which runs into closed coils 43 and a second branch line 40 which leads steam to steam jet nozzles 41. Modulating valves 53 regulate the steam pressure to steam nozzles 41 and coils 43. As incoming air flows in the direction of arrows 35, it encounters nozzles 41 and steam coils 43. It exits at 36 as heated moisture-laden air. Condensed steam 42 is collected by catch basin 44 and returned via pipe 45 by pump 5 to boiler 37. Steam from coils 43 exits to boiler 37 by pipe 46.

Figure 7:
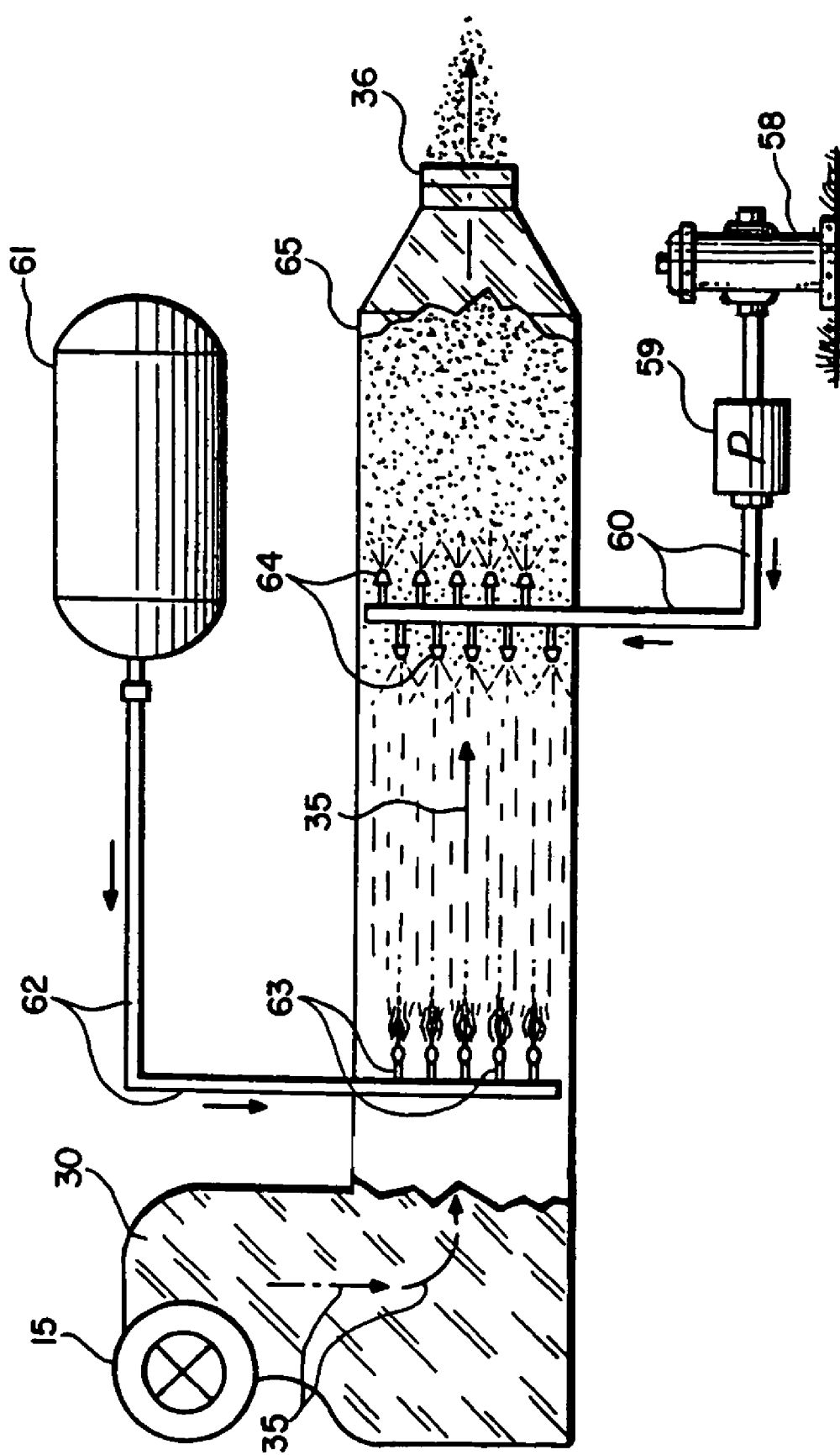
FIG. 7 is a fourth embodiment of the inventors showing a cutaway side view.

FIG. 7 is a schematic view of another embodiment of the invention. Blower 15 forces ambient air through a heat resistant plenum 65. The ambient air moves in the direction of arrows 35. The air first encounters burner jets 63 which are fed by a propane source 61 through propane line 62. In operation the flames of these jets heat the air up to about 800° F. Obviously this hot dry air is unacceptable for aircraft de-icing operations. A water supply 58 feeds water through pump 59 to water pipe 60 to water nozzle 64. When the hot dry air encounters water nozzle 64 spray, it is cooled to about 150° F. to 180° F. and becomes close to being saturated. This warm moisture-laden air then leaves nozzle 36 and is directed to a delivery head (not shown in FIG. 7).

The invention claimed is:

1. An apparatus for melting snow, ice and frozen ground comprising: a boiler adapted to heat a liquid to a temperature below the boiling point; a first circulating pump; an outlet line; an inlet line; a series of enclosed coils adapted to carry said liquid through a plenum-type housing; a separate water supply and a second circulating pump adapted to carry water to nozzles and direct said water at said enclosed coils; a blower adapted to introduce ambient air past said nozzles and said enclosed coils to an outlet of said plenum and into a delivery duct and delivery head located proximate a surface to be melted; and also comprising a reservoir adapted to catch used water and direct it back to said second circulating pump.

2. An apparatus according to claim 1 wherein said liquid is water and ethylene glycol.

3. An apparatus according to claim 1 further including a mobile reservoir mounted on a vehicle and adapted to hold and dispense said aqueous liquid after having been heated by said boiler.

4. An apparatus for melting snow, ice and frozen ground comprising: a boiler adapted to heat a liquid to a temperature below the boiling point; a first circulating pump; an outlet hose; an inlet hose; a series of enclosed coils located in a plenum-type housing and adapted to carry said liquid; a means to wet said coils with water; a blower adapted to move ambient air past said nozzles and said enclosed coils to an outlet of said plenum-type housing and through a delivery duct and delivery head located above a surface to be melted; and also comprising a reservoir adapted to catch used water and direct it back to said means to wet said coils.

* * * * *